(12) United States Patent
Gaither et al.

(10) Patent No.: US 8,234,459 B2
(45) Date of Patent: Jul. 31, 2012

(54) SWITCH MODULE BASED NON-VOLATILE MEMORY IN A SERVER

(75) Inventors: Blaine D. Gaither, Fort Collins, CO (US); Andrew R. Wheeler, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 568 days.

(21) Appl. No.: 12/403,712

(22) Filed: Mar. 13, 2009

(65) Prior Publication Data

US 2010/0235562 A1 Sep. 16, 2010

(51) Int. Cl.
*G06F 12/00* (2006.01)

(52) U.S. Cl. ........ 711/147; 711/103; 711/114; 711/170; 711/202

(58) Field of Classification Search .................. None
See application file for complete search history.

(56) References Cited

U.S. PATENT DOCUMENTS

| | | | |
|---|---|---|---|
| 2003/0033363 A1* | 2/2003 | Garnett et al. | 709/203 |
| 2008/0244172 A1* | 10/2008 | Kano | 711/112 |
| 2008/0301256 A1* | 12/2008 | McWilliams et al. | 709/214 |

* cited by examiner

*Primary Examiner* — Shawn X Gu

(57) ABSTRACT

A switch module having shared memory that is allocated to other blade servers. A memory controller partitions and enables access to partitions of the shared memory by requesting blade servers.

14 Claims, 5 Drawing Sheets

SWITCH MODULE BASED NON-VOLATILE MEMORY IN A SERVER

BACKGROUND

Blade servers are self-contained all inclusive computer servers, designed for high density. Whereas a standard rackmount server has a power supply and networking capability, blade servers have many components removed for space, power and other considerations while still having all the functional components to be considered a computer (i.e., memory, processor, storage).

The blade servers are housed in a blade enclosure. The enclosure can hold multiple blade servers and perform many of the non-core services (i.e., power, cooling, networking) found in most computers. Non-blade computers require components that are bulky, hot, and space-inefficient. By locating these services in one place and sharing them amongst the blade servers, the overall component utilization is more efficient.

Computers typically need bulk data storage to store operating systems, applications, and data for the server system. This bulk storage of data is typically accomplished with magnetic hard drives. One or more hard drives can be located in the enclosure or connected to it over a network. Hard drives add bulk, heat, and complexity from moving parts that are more prone to failure.

DETAILED DESCRIPTION

The following detailed description is not to be taken in a limiting sense. Other embodiments may be utilized and changes may be made without departing from the scope of the present disclosure.

Figure 1:
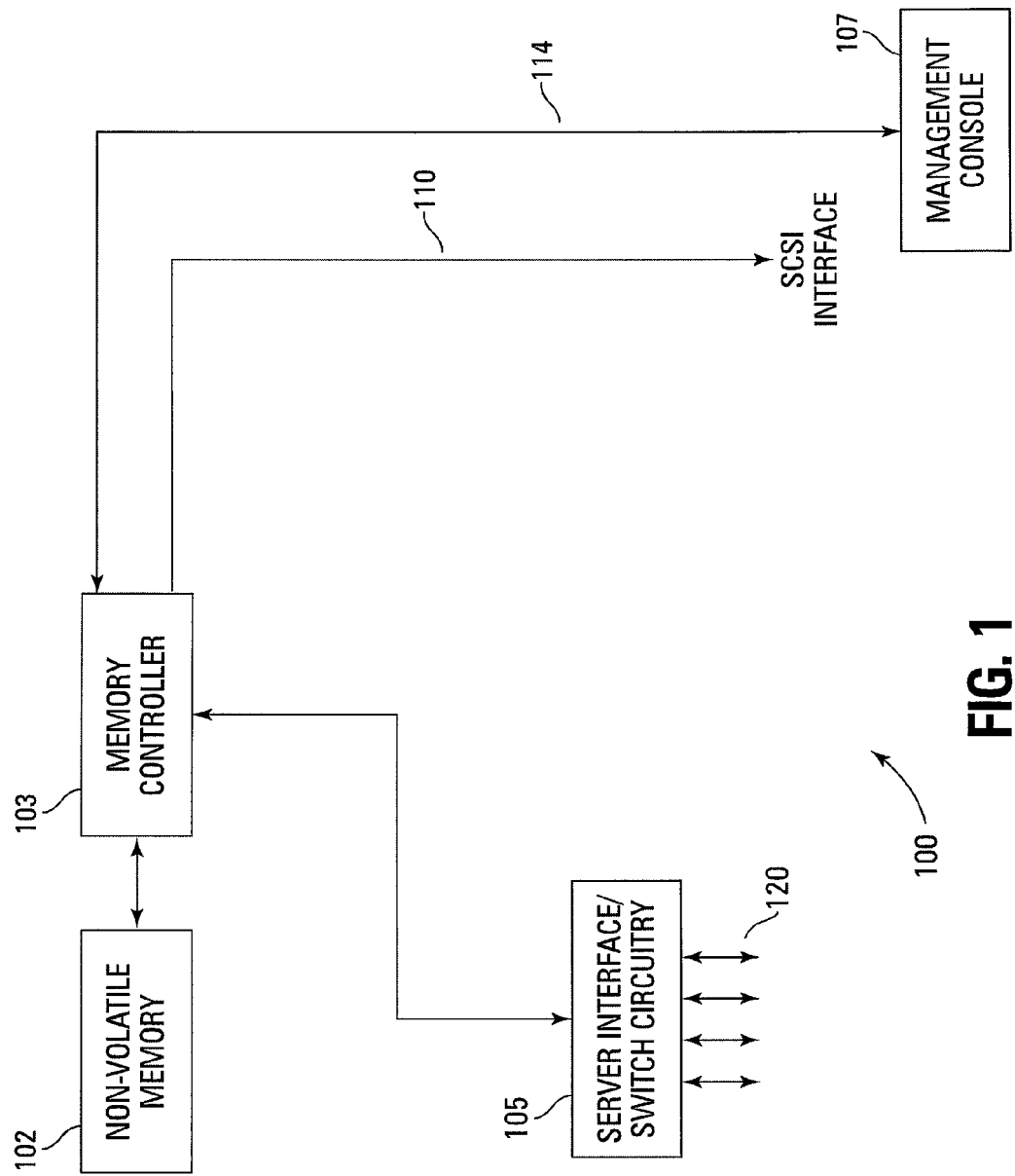
FIG. 1 depicts a block diagram of one embodiment of a switch module incorporating shared memory.

FIG. 1 illustrates a block diagram of one embodiment of a switch module 100 that incorporates shared non-volatile memory 102 that can be allocated between blade servers in a server system. The switch module 100 can be incorporated into one or more blade servers as described subsequently with reference to FIG. 2. In one embodiment, the switch module 100 is an Ethernet switch module.

In one embodiment, the shared memory 102 is comprised of a number of flash memory devices that are coupled to and controlled by a memory controller block 103. The memory controller block 103 is responsible for interfacing the memory devices 102 to external elements of the server system and controlling operation of the memory devices 102. The memory controller block 103 can be used to control and maintain wear-leveling mapping tables for access to the memory. Since flash memory devices 102 can only be used for a certain number of write/erase cycles, the memory controller block 103 performs a wear-leveling operation to spread the memory use over substantially all of the memory devices 102. Thus the memory controller block 103 prevents any one memory location from being accessed repetitively. Some of the accesses to that address can be mapped to other, less used addresses. Flash memory is used as an example nonvolatile memory technology, but other nonvolatile memory technologies could be used. The specific functions of the memory controller are dependent upon the NV memory technology used.

The memory controller block 103 is coupled to a management console 107, over an external management interface 114, that provides external control of the memory devices 102. The management console 107 and memory controller block 103 are responsible for setting up the memory devices as described subsequently with reference to the flowchart of FIG. 3.

In an alternate embodiment, the shared memory 102 is a solid state drive system that incorporates a number of nonvolatile memory devices such as flash memory. In such an embodiment, the memory devices 102 and controller block 103 can be combined into one drive unit.

A solid state drive is comprised of multiple flash packages where each package can be comprised of many memory dies. Solid state drives are used in computers to replace the hard disk drives that typically have used magnetic or optical disks for storing large amounts of data. A solid state drive does not use moving parts whereas a hard disk drive requires a complex and sensitive drive and read/write head assembly to interact with the magnetic/optical disk. Thus, the solid state drives are more resistant to damage and loss of data through vibration and impacts.

A Flash Translation Layer (FTL) works in conjunction with an operating system to make the flash memory of the solid state drive appear to the operating system as a disk drive. This is accomplished by the FTL creating virtual small blocks of data, also known as sectors, out of flash erase blocks. The FTL also manages and maps data on the solid state drive so that it appears to the system to be written in a certain location when in fact it is being stored, for wear leveling purposes, in different locations of the flash memory.

The switch module 100 may also be comprised of an external Small Computer System Interface (SCSI), SATA, FC or other storage connection 110 that connects the memory controller 103 to external network elements. The storage connection 110 can be used by the blade enclosure, blade servers, and/or an external computer system to access the memory devices 102 through the memory controller block 103. This external connection could be used to mirror data on another blade, or provide access to storage on the switch module in the presence of a failure.

An interface/switch circuit 105 is coupled to and interfaces the memory controller block 103 to the other blade servers of the system. The server interface circuit 105 interfaces the switch module 100 to the server system backplane signals. In one embodiment, this interface is a Peripheral Component Interconnect Express (PCI-E) interface 105. The PCI-E interface 105 has multiple ports 120 that are connected to the blade server system enclosure backplane to be routed to blade servers in the system. Alternate embodiments can use other interface circuits incorporating other interface protocols in place of the PCI-E interface. This block 105 also comprises switch circuitry that can be comprised of standard Ethernet switch circuitry, or other types of switches, that is configured to switch server signals between input connections and output connections.

Data stored in the shared memory 102 can be compressed prior to being stored and decompressed after being read out from the memory. Any available compression and decompression routines can be implemented for the compression/ decompression. The data compression frees up additional memory space for use by the blade servers.

Figure 2:
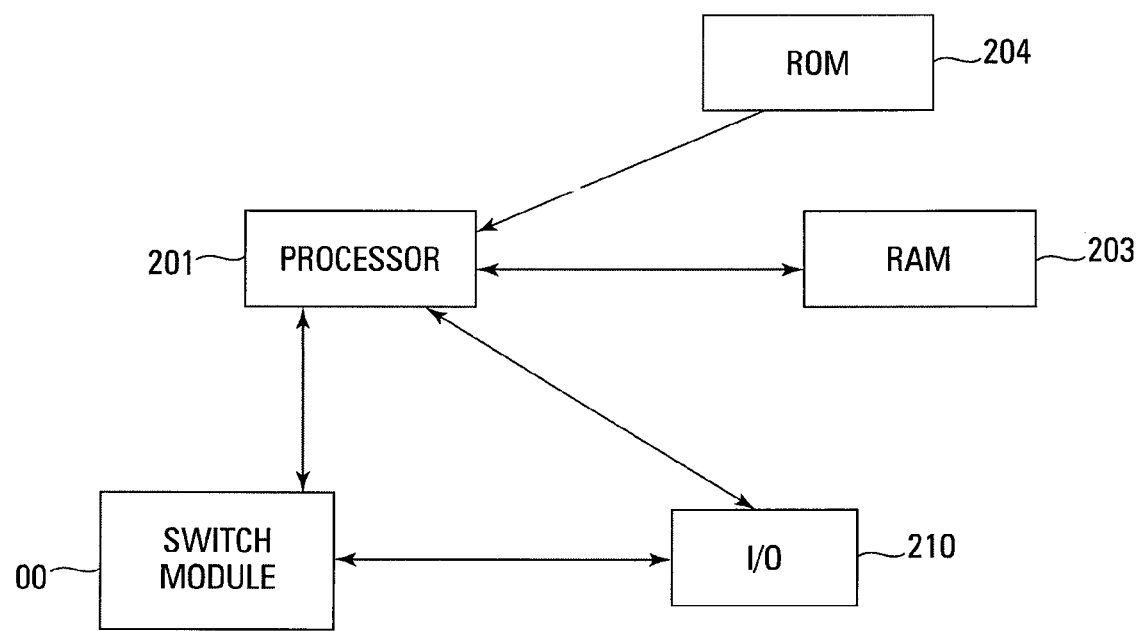
FIG. 2 depicts a block diagram of one embodiment of a blade server that incorporates the switch module of FIG. 1.

FIG. 2 illustrates a block diagram of one embodiment of a blade server that interfaces with the switch module 100 of the present embodiments. The blade server is comprised of a processor 201 or some other type of controller circuit that controls operation of the blade server and executes applications, operating systems, and/or other software as instructed by the blade server system. In one embodiment, the switch module is a separate hot plug component in the blade server chassis. The switch module, in one embodiment, is coupled to a blade server through a mezzanine card.

Random access memory (RAM) 203 is coupled to the processor 201 for temporary storage of data generated by the processor 201 during execution of an application or other software routine. Read only memory (ROM) 204 is coupled to the processor 201 and contains the operating system and/or other routines routinely executed by the processor 201. For example, the ROM 204 might contain routines for accessing the switch module 100 or the server input/output (I/O) 210.

The server I/O 210 is coupled to both the processor 201 and the switch module 100. The I/O 210 is comprised of the circuits necessary for communicating over the blade server system backplane. For example, the I/O 210 can include a PCI-E interface to communicate with the switch module 100.

Figure 3:
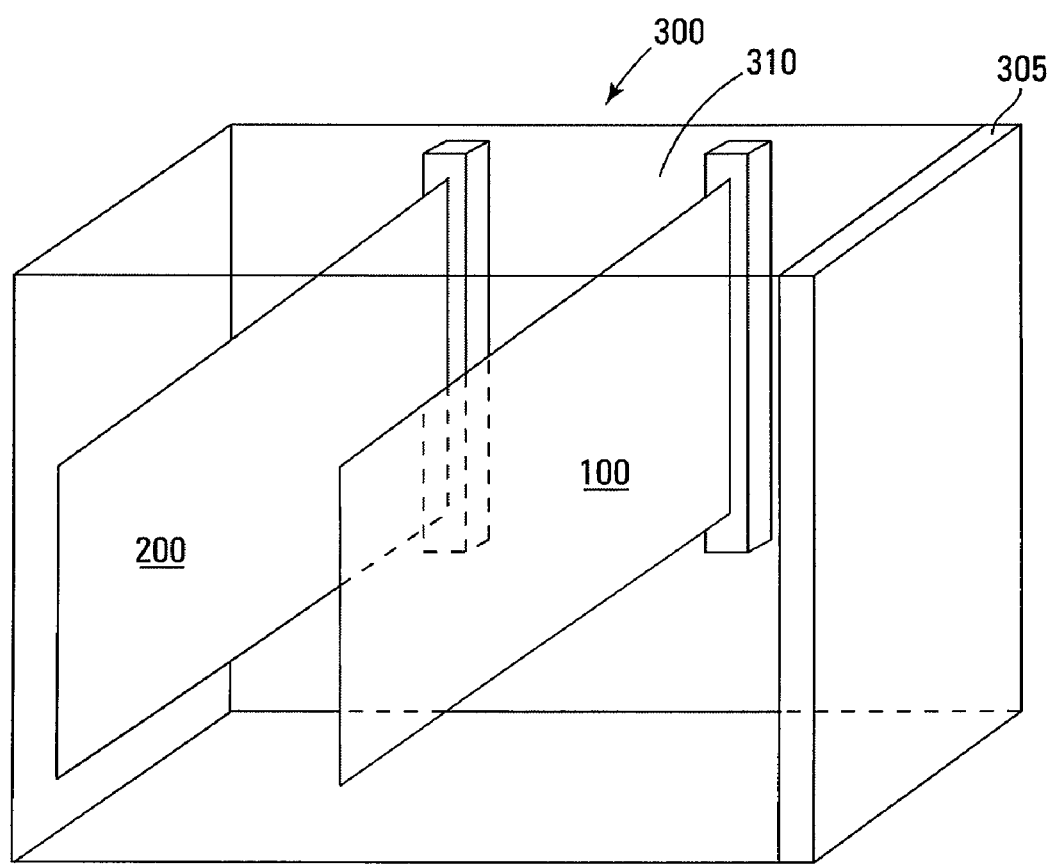
FIG. 3 depicts a diagram of one embodiment of a blade server system enclosure.

FIG. 3 illustrates a diagram of one embodiment of a blade server system enclosure 300. The enclosure 300 is comprised of a plurality of blade servers 200 as discussed previously. Also plugged into the backplane is a switch module 100 with the shared non-volatile memory that is accessible by blade servers in the enclosure 300. In one embodiment, the switch module 100 is coupled to a blade server 200 with a mezzanine card.

The blade servers 200 are connected to a system backplane 310 that contains the circuitry, circuit traces, and interconnects that connect each blade server 200 to switch modules 100 and to the system power supply 305. The interconnect could, for instance, be optical or electrical. The backplane 310 can also comprise any other circuitry shared by the blade servers. In one embodiment, mezzanine cards (not shown) are used to also connect the switch modules 100 to the blade servers 200.

Figure 4:
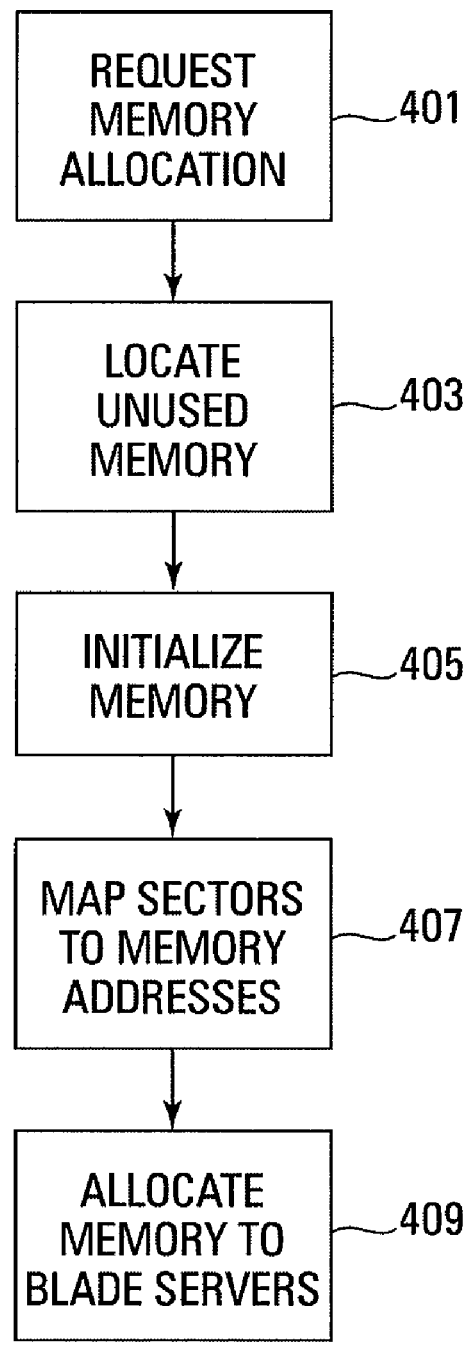
FIG. 4 depicts a flow chart of one embodiment of a method for allocating the shared memory of FIG. 1.

FIG. 4 illustrates a flowchart of one embodiment of a method for operation and allocation of the shared memory on the switch module. A system user or automated agent requests that portions of the memory be allocated to a certain blade server 401. In one embodiment, an automated agent includes an application of operating system executing in server memory.

The memory controller block locates unused memory locations 403 using a metadata database or look-up table. The database can be stored internally to the memory devices, in the PCI-E interface of the switch module, in memory internal to the memory controller, or some other memory location.

If the shared memory of the switch module is configured as a solid state drive, the drive controller or the PCI-E interface, on request from the user or automated agent, can allocate one or more sectors of the solid state drive to the requestor. The memory controller or PCI-E interface can also be responsible for tracking which sectors are available for allocation.

Step 405 initializes the memory to be allocated. The specifics of initialization are dependent upon the technology of the non-volatile memory. In the case of flash memory, since flash memory needs to be in the erased state prior to being programmed, it might be necessary for the memory controller or solid state drive controller to erase the memory prior to being used by the requester. For example, if unused memory locations or solid state drive sectors available for use are not zero, the controller would have to erase the necessary memory blocks/sector(s) prior to use by another blade server.

Once the memory is ready to be allocated, the memory controller or the PCI-E interface on the switch module are programmed to provide the proper mapping of logical memory address ranges or logical solid state disk sectors to physical memory addresses 407. Thus, when a blade server transmits a certain logical address to be read or written, the memory controller or PCI-E interface maps the data to the physical sector or physical address range assigned to that logical address. Either the memory controller or the PCI-E interface stores the physical sector/address range map.

Figure 5:
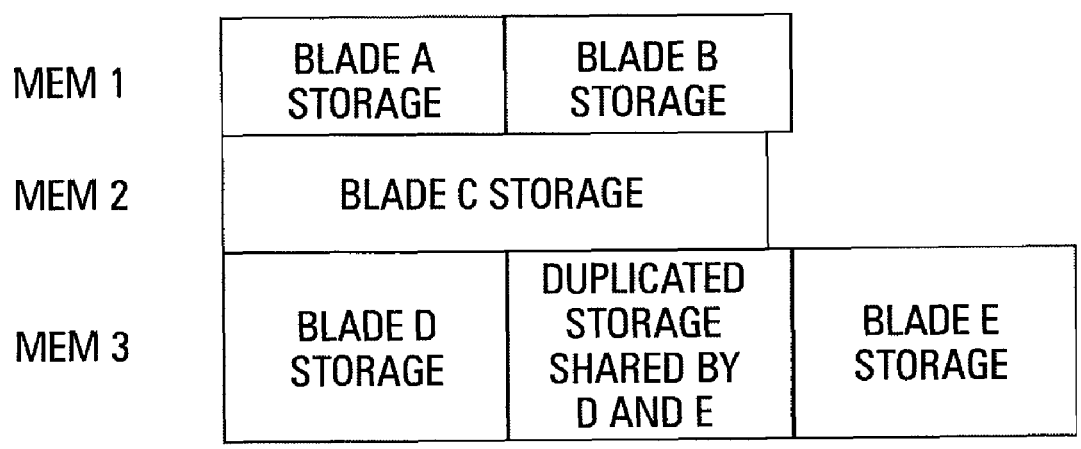
FIG. 5 depicts one embodiment of a memory allocation diagram in accordance with the shared memory of FIG. 1.

The memory controller then allocates the memory/sectors and enables access to the solid state drive or memory devices from the specified blade servers 409. One example of an allocation of the shared memory devices is illustrated in FIG. 5.

The terms MEM1-MEM3 are for purposes of illustration only to show examples of allocation of memory to blade servers. In one embodiment, MEM1-MEM3 are each indicative of a memory range that is assigned to certain blade servers. In other embodiments, MEM1-MEM3 can each be indicative of solid state drive sectors or memory devices.

This diagram shows that MEM1 is allocated to blade server A and blade server B. MEM2 is allocated to blade server C. MEM3 is allocated to both blade servers D and E with a section of memory to be shared by both blade servers D and E.

Since the memory controller or PCI-E interface tracks memory allocation, it can be determined how much memory can be allocated to any one blade server. For example, as more blade servers request additional memory space, the memory controller or PCI-E interface can dynamically reallocate the memory to the newly requesting servers by taking away some memory from one server and giving it to another. Thus, a blade server may be dynamically allocated no memory or a large memory address range/sector, depending on the memory availability. In addition the memory controller or PCI-E interface may perform functions such as compression and decompression, as well as deduplication of the data in the non-volatile memory.

In summary, switch module based memory is provided in a blade server and can be allocated to other blade servers in a server system. A PCI-E interface and/or memory controller provide memory control and allocation amongst the other servers. The switch module based memory may be located on one or more blade servers in the server system.

What is claimed is:

1. A switch module based non-volatile memory on a first blade server, the switch module comprising:
    at least one non-volatile memory device;
    a memory controller coupled to and configured to control the at least one non-volatile memory device and configured to deduplicate data written to shared memory on a blade server system;
    an interface circuit coupled to the memory controller, the interface circuit configured to allocate memory of the at least one non-volatile memory device to a second blade server in the blade server system; and
    a switching circuit for switching server signals to the memory controller.

2. The switch module of claim 1 wherein the at least one non-volatile memory device comprises a plurality of non-volatile memory devices having an address range at least partially allocated to the second blade server by the interface circuit.

3. The switch module of claim 1 further comprising an external management interface for interfacing the memory controller to a management console.

4. A switch module based shared memory on a blade server, the switch module comprising:
   a solid state drive comprising a plurality of non-volatile memory devices and a memory controller, the solid state drive organized into a plurality of sectors; and
   a Peripheral Component Interconnect Express (PCI-E) interface coupled to the solid state drive and configured to allocate the sectors of the solid state drive to blade servers in a blade server system and configured to deduplicate data written to shared memory on the blade server system.

5. The switch module of claim 4 wherein the memory controller is configured to map assignment of the plurality of sectors to a range of physical memory addresses for the plurality of non-volatile memory devices.

6. The switch module of claim 4 wherein the PCI-E interface is further configured to track mapping of the plurality of sectors to memory addresses assigned to the plurality of non-volatile memory devices.

7. The switch module of claim 4 wherein the memory controller is configured to enable access to the solid state drive in response to allocation of the sectors to the blade servers.

8. A method for operation of switch module based shared memory on a blade server, the method comprising:
   locating unused memory locations in the shared memory on a blade server in a blade server system;
   controlling the shared memory using a memory controller, wherein the memory controller is coupled to the shared memory, and wherein controlling the shared memory includes:
      erasing unused memory locations if they are still programmed;
      mapping unused memory locations to physical memory addresses of the shared memory; and
      deduplicating data written to the shared memory using the memory controller; and
   allocating access to unused memory locations from a predetermined blade server using an interface circuit, wherein the interface circuit is coupled to the memory controller.

9. The method of claim 8 further comprising receiving a request for allocation of at least a portion of the shared memory to a blade server.

10. The method of claim 8 wherein mapping unused memory locations comprises a peripheral component interconnect express interface circuit tracking a map of solid state disk sectors to physical memory addresses.

11. The method of claim 8 wherein the shared memory is organized as a solid state disk drive having a plurality of logical sectors wherein each logical sector is mapped to a physical memory address by a memory controller.

12. The method of claim 8 and further comprising enabling access to unused memory locations by the predetermined blade server.

13. The method of claim 8 and further including storing a database of unused memory locations in one of a memory controller or a peripheral component interconnect express interface circuit.

14. The method of claim 8 and further including compressing the data prior to writing the data to the shared memory and decompressing the data after reading the data from the shared memory.

* * * * *